UNITED STATES PATENT OFFICE.

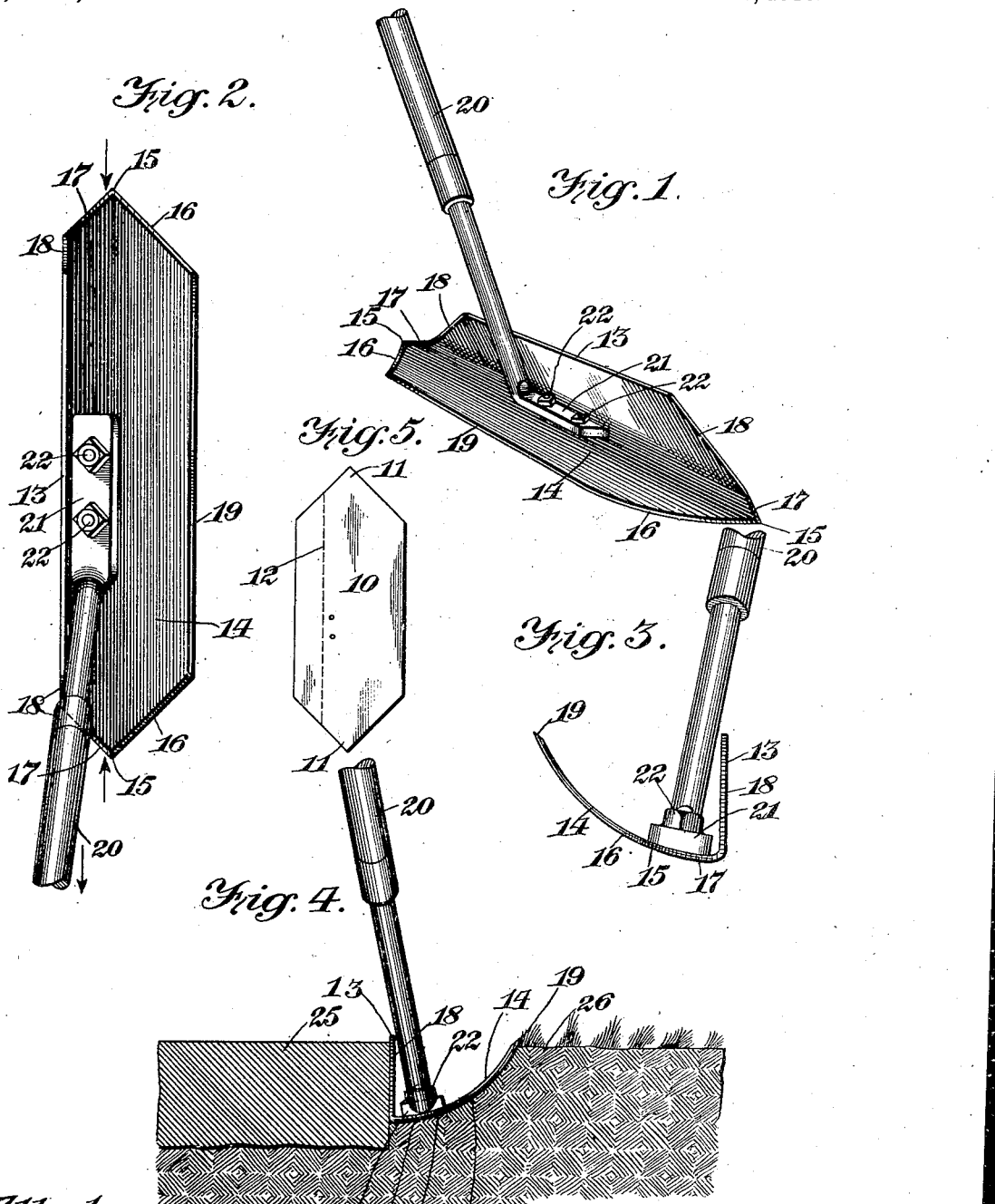

THOMAS J. UNDERWOOD, OF PEORIA, ILLINOIS.

LAWN-TRIMMER.

1,082,570.  Specification of Letters Patent.  Patented Dec. 30, 1913.

Application filed July 22, 1912. Serial No. 710,847.

*To all whom it may concern:*

Be it known that I, THOMAS J. UNDERWOOD, a citizen of the United States, and residing at Peoria, in the county of Peoria and State of Illinois, have invented certain new and useful Improvements in Lawn-Trimmers, of which the following is a specification.

This invention relates to lawn trimmers adapted to be drawn along the edge of the walk or curb to cut a groove or trench in the sod and trim the edge of the lawn.

The edges of the lawn adjacent the walk or curb cannot be cut with a lawn mower or even a sickle so as to present a neat appearance. It is therefore customary to cut a shallow groove or trench in the sod along the walk or curb so as to leave a clean cut grass edge. It is however difficult to make a clean cut edge with the tools as now used, as the sod is difficult to cut, due to the presence of roots, stones and other material forming the base of the ordinary lawn bed. It often happens, especially in brick walks, that the grass will grow in the cracks between the bricks, thus presenting a very ragged and undesirable appearance.

One of the objects of this invention therefore is to provide an implement especially designed for the purpose of cutting a groove or trench along the edges of the lawn, which implement is so constructed that it will make a clean cut, leaving a clean cut grass edge, which is adapted to be easily drawn through the sod, and by means of which the depth of the cut can be accurately controlled.

Another object is to construct an implement which besides being adapted to cut a groove or trench in the sod, is also adapted to cut the grass growing between the bricks and in cracks of the walk.

Another object is to design an implement which is simple in its construction, cheap to manufacture, light in weight, and effective in its operation; and further objects will appear from the detail description taken in connection with the accompanying drawing in which:

Figure 1 is a perspective view of a tool embodying this invention, Fig. 2 is a plan view, Fig. 3 is a rear elevation looking in the direction of the arrow at the top of Fig. 2, Fig. 4 is a front elevation of the tool looking in the direction of the arrow at the bottom of Fig. 2, and Fig. 5 is a view of the blank from which the cutting member or blade is made.

Referring to the drawing, 10 designates a blank cut to form pointed ends 11, the blank when cut being symmetrical. This blank is folded on the dotted line 12 to form a straight vertical side 13, and the body of the blank is shaped to form a concave side 14 the upper edge of which extends to practically the same height as the upper edge of 13. The blank so shaped forms a channel-shaped cutting member or blade having one side 13 straight and vertical and the other side 14 concave. The ends of this member or blade taper to points forming sharp noses 15. It will be noted that the points of the noses lie slightly to one side of the center line of the blade, these points being nearer the side 13 than the upper edge of the side 14. The inclined edges 16 and 17, the edges 18, which form continuations of the edges 17 but now extend upwardly and toward the center of the blade, and the upper edge 19 of the side 14, are sharpened to form cutting edges.

A handle 20 is provided with a foot piece 21, having holes arranged to receive screws or bolts 22 passing through or secured to the blade. These screws are positioned close to the side 13 so that the handle will be clamped on the blade close to the vertical side thereof. This handle when in position will be inclined longitudinally as well as transversely of the blade. This is clearly shown in the drawing.

The method of operating the implement is shown in Fig. 4. The device is intended to be drawn toward the workman and in the direction of the arrow positioned alongside of the handle in Fig. 2. As it is drawn along the edge of the walk or curb 25, the side 13 will form an edge guide engaging the edge of 25. The depth of the cut can be controlled by lowering or raising the end of the handle so as to vary the inclination of the blade with respect to the sod 26. This will cause the nose to cut deeper or shallower. As the handle is inclined transversely with respect to the blade, this handle will project over the walk or curb, so that the workman or person handling the implement need not walk on the grass. This implement will cut a groove or trench, and if such a trench has been cut, the sharp edges 16 and 19 will cut the edge of the grass projecting over the trench so as to make a clean cut lawn edge. The implement as assembled in the drawing is a right handed tool with the lower nose (Fig. 2) cutting. In order to change it into a left handed tool, the handle is reversed by unbolting it and then rebolting it in reversed position. While in the embodiment shown the implement is provided with a nose at each end so that the blade is duplex in form, it is obvious that the blade may be made short and pointed at one end only. In that case right and left handed blades are of reverse formation.

In order to cut off grass projecting through the walk or through the cracks between the bricks at the edge of the walk or curb, the implement can be used as a hoe, and this grass can be cut off by the sharp edge 19. Due to the inclination of the handle with respect to the blade, this cut is in the nature of a draw cut.

It will thus be seen that the invention accomplishes its objects. An implement is provided which is not only simple in construction and cheap to manufacture, but which is effective in its operation. The provision of the pointed nose on the end of the implement permits this nose to plow through the ground with a small amount of resistance. This also prevents clogging or stopping by roots, etc., as these substances will when encountered slide along the slanting edges and thus be cut. The implement can therefore be drawn toward the workman with comparatively slight effort. This also enables the depth of the groove or trench to be easily controlled by varying the inclination of the handle and of the blade with respect to the sod. The sharp edges will cause a clean cut trench and clean cut lawn edge. As the implement is so constructed that it can be drawn toward the workman instead of pushed, the blade can be made of very light construction.

It is obvious that various changes may be made in the details of construction without departing from the spirit of this invention, and it is therefore to be understood that this invention is not to be limited to the specific construction shown and described.

Having thus described the invention what is claimed is:

1. A lawn-trimmer comprising a channel-shaped blade having one of its sides shaped to form an edge guide, said blade having a sharp pointed nose formed on each end thereof, and one of the side edges of said blade being sharpened to provide a cutting edge.

2. A lawn trimmer formed from a single sheet of metal tapering to a central point, the sheet having a sharp bend along a line longitudinally of the sheet and to one side of said point to form an edge guide, and the remainder of the sheet being formed concave with respect to the guide forming side to form therewith a channel shaped blade having a sharp pointed nose positioned to one side of said edge guide, and a handle secured to said blade and arranged to extend over the walk or curb when the device is run therealong.

3. A lawn trimmer formed from a single sheet of metal tapering at its ends to central points, the sheet being bent along a line longitudinally of the sheet and to one side of said points to form a channel shaped blade having a vertically arranged edge guide and a sharp pointed nose on each end of said blade positioned to one side of said edge guide.

In testimony whereof I affix my signature in presence of two witnesses.

THOMAS J. UNDERWOOD.

Witnesses:
MARTIN C. JANSSEN,
JOHN S. JANSSEN.